(No Model.)
G. W. BAIRD.
Fresh Water Distilling Apparatus.
No. 233,184. Patented Oct. 12, 1880.
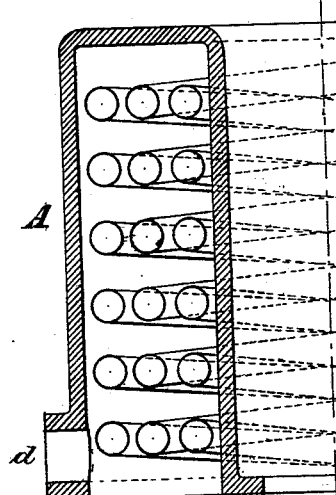
Fig. 1.
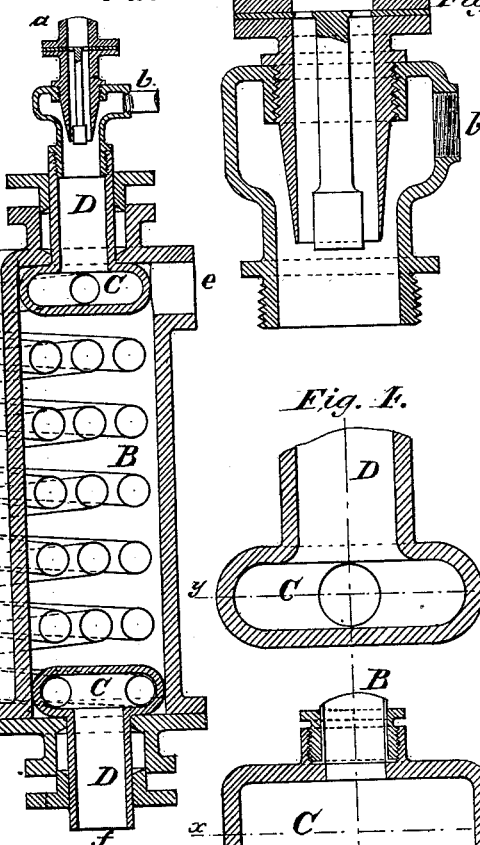
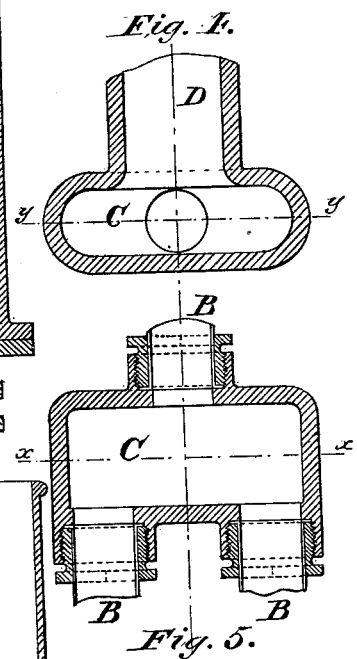
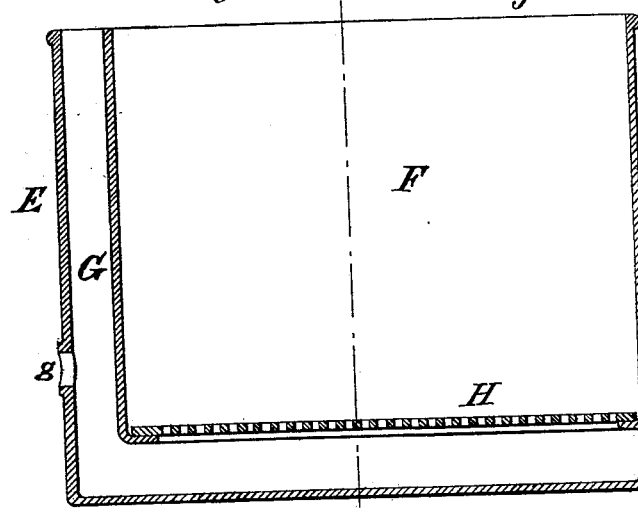
Fig. 2.
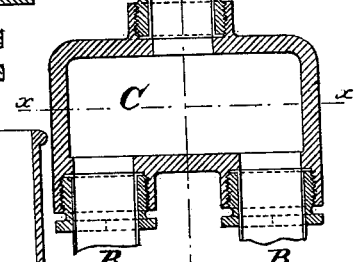
Fig. 5.
WITNESSES: Jesse J. Prather, Charles A. Harvey, Jr.
INVENTOR: G. W. Baird.

UNITED STATES PATENT OFFICE.

GEORGE W. BAIRD, OF UNITED STATES NAVY.

FRESH-WATER-DISTILLING APPARATUS.

SPECIFICATION forming part of Letters Patent No. 233,184, dated October 12, 1880.

Application filed September 14, 1880. (No model.)

*To all whom it may concern:*

Be it known that I, G. W. BAIRD, of the Engineer Corps of the United States Navy, residing at Washington, District of Columbia, have invented certain new and useful Improvements in a Fresh-Water-Distilling Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In patents dated August 19, 1869, and January 5, 1875, granted to me for an aerator, which device mixed atmospheric air with the steam previous to its condensation, the steam being thoroughly mixed, molecule to molecule, the water inclosed and dissolved the air to its point of saturation, thus rendering the water sharp; but by subsequent experiments, both with pure air and with oxygen, I have discovered that quantities of organic matter which were distilled over with the steam can be oxidized, and that by the use of a filter of purified animal charcoal these oxides can be separated from the water, leaving it pure and potable.

In the drawings, Figure 1 is a vertical cross-section of the condenser. Fig. 2 is a vertical cross-section of the filter. Fig. 3 is a vertical cross-section of the aerator. Fig. 4 is a vertical cross-section of the T-head for holding the ends of the coils on line $x\ x$. Fig. 5 is a horizontal section of the T-head on the line $y\ y$.

To effect this economically I have changed the form of the aerator so as to bring the air or gas to it through pipes, and when a high state of oxidation or aeration is necessary I introduce a plug into the jet $a$, so as to make the steam enter in an annular jet instead of a solid one, thus bringing more surface of steam proportionally into contact with the gas than otherwise. This aerator will work if the steam and air openings be changed—*i. e.*, the steam enter through the opening $b$ and the air through $a$, or vice versa.

For a condenser, A, having an inlet, $d$, and an outlet, $e$, for the circulating water, I use one or more pipes, B, usually, but not essentially, of circular section, these pipes being coiled into helices and their ends terminating into a common T-head, C, both at the upper and lower ends, and are secured by screw-thimbles against the flanged ends of the pipes, where a lead or a ground or other joint may be used. These helices have different radii of generatrix and are coiled (when more than one is used) right and left handed alternately, in order to give more room to make the joints. The coils are drawn each from a single piece of metal, and may be plated or not. They are without joints or seams, excepting at their ends. The metal usually employed for these coils is tin.

The lower T-head, in which the coils terminate, is open to the atmosphere, which prevents any great pressure accumulating inside the coils.

The shell of the condenser is cylindrical in form, with one (the lower) head removable, and has a stuffing-box on each head for the pipe D of the T-head to pass through. In order to improve the circulation of the water which surrounds the coils the shell of the condenser is made annular, the center part displacing the circulating water and compelling it to come in contact with the surface of the coils. The shell may be made a plane cylinder, with a wooden or metallic cylinder in place of the central portion shown in the drawings, as either would effect the same object, and which is apprehended.

The filter E is a vessel divided into two compartments, F and G, one of which, F, contains animal charcoal which has been purified. The charcoal rests upon a sieve or false bottom, H, having a channel-way beneath, which latter is in common with the compartment G, to which the outlet-pipe $g$ is connected, and this outlet is so far above the bottom that the particles of solid matter which may have passed through the sieve will not reach it and stop it up.

To operate the method, a current of refrigerating-water is started into the condenser at $d$, which circulates around the coils and passes out at $e$, which keeps the condensing-surface cool. Steam is then let through a valve or cock into the aerator at $a$, and it will induce a current of gas or air through $b$, which will be mixed in the aerator and also in the coils.

This gas may be regulated by a valve or cock. (Not shown.) The steam is condensed in the coils upon their cold surfaces, and in condensing incloses its equivalent of air, while the oxygen present, either pure or diluted, oxidizes the organic matter. From the coils the water and foreign matter flows through the opening $f$ into the filter E, flowing through the filtering material which rests upon the sieve H, and finally passing out through the outlet $g$ into a reservoir for use.

Having thus described my invention, what I claim, and desire to secure by Letters Patent, is—

1. The method herein described of distilling and aerating water and of oxidizing and removing the organic matter from the water, consisting in introducing the steam and oxygen or steam and air in annular jets into the condenser for oxidizing the organic matter and aerating the water, substantially as specified.

2. In an apparatus for distilling and aerating water, a condenser consisting of an annular shell provided with a series of coils connected to T-heads at both ends, substantially as described.

3. A filter of animal charcoal which has been purified consisting of a vessel divided into two compartments, with the animal-charcoal filtering material resting upon a false bottom, and the outlet or discharge pipe arranged above the bottom, substantially as specified.

In testimony whereof I affix my signature in presence of two witnesses.

G. W. BAIRD.

Witnesses:
CHAS. A. HARVEY, Jr.,
WM. F. HELLER.